April 19, 1927. 1,625,673
V. P. NELSON
CANOPY HOLDER
Filed May 4, 1926
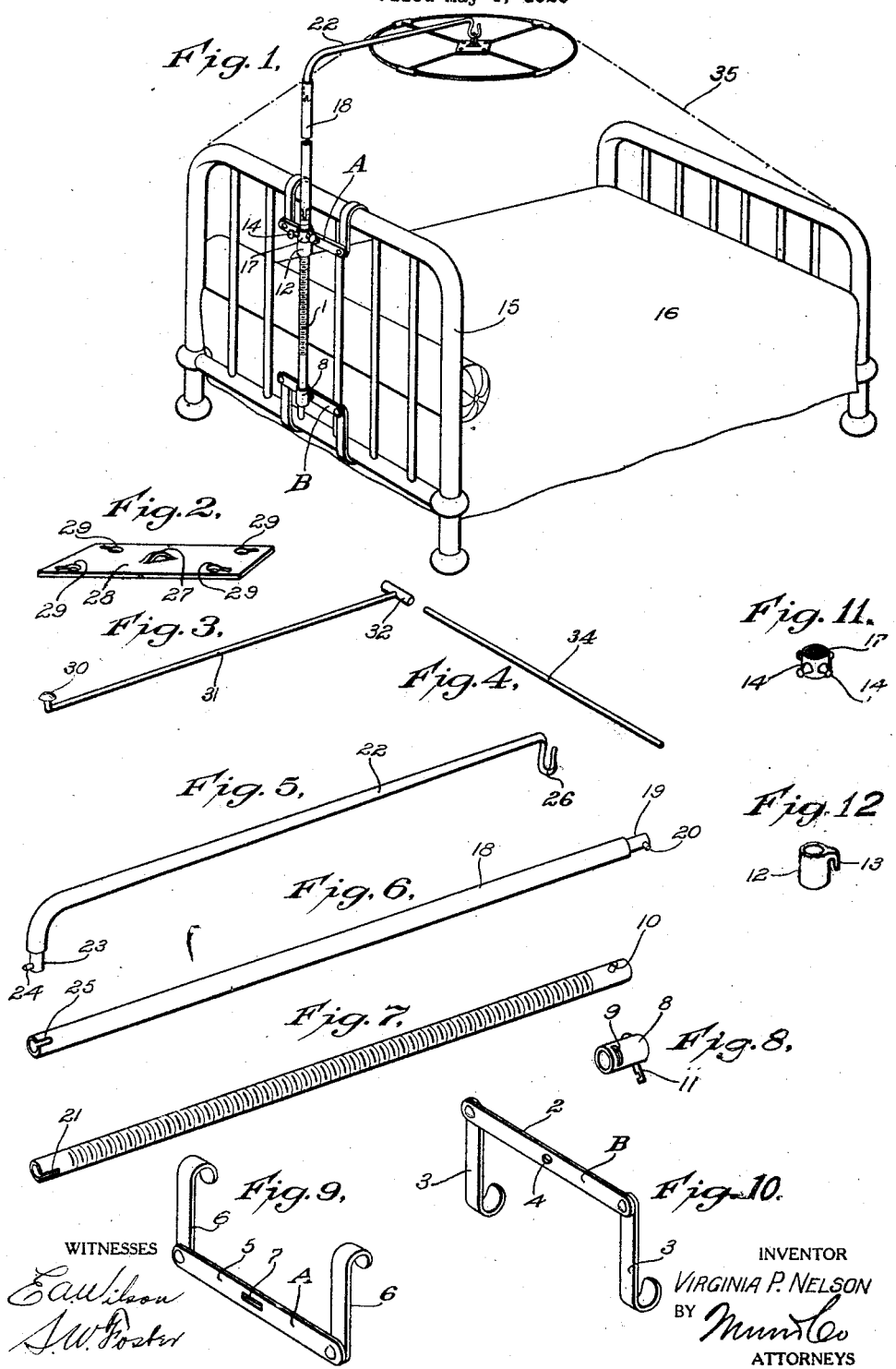

Patented Apr. 19, 1927.

1,625,673

UNITED STATES PATENT OFFICE.

VIRGINIA P. NELSON, OF NEW YORK, N. Y.

CANOPY HOLDER.

Application filed May 4, 1926. Serial No. 106,719.

This invention relates to canopy holders, an object of the invention being to provide a knockdown foldable or collapsible canopy holder which can be easily and quickly located in operative position on a bed and which will serve to support a canopy of mosquito netting and the like so as to effectually protect the occupant of the bed from annoyance of mosquitoes, flies and other insects.

A further object is to provide a device of this character which may be knocked down or taken apart and packed and stored in a very small space so that it can be conveniently transported or shifted.

A further object is to provide a device of this character which is especially adapted for the traveling public, permitting the same to be carried in a small package in an automobile or traveling bag, and which can be readily assembled for use whenever desired.

A further object is to provide a device of this character which can be manufactured and sold at a reasonably low price and which will most efficiently perform the functions for which it is intended.

A further object is to improve upon the construction disclosed in Patent No. 1,565,191, granted to me on December 8, 1925.

With these and other objects in view, the invention consists in certain novel features of construction and combinations and arrangements of parts, which will be more fully hereinafter described and pointed out in the claims.

In the accompanying drawings—

Figure 1 is a perspective view, showing my improved device in operative position on a bed;

Figures 2, 3, 4, 5, 6, 7, 8, 9, 10, 11 and 12 are detail perspective views, illustrating the several parts which go to make up my improved device.

My improved canopy holder comprises a screw-threaded rod 1, which may be tubular, and which is operatively connected to a pair of hook members A and B, illustrated in detail in Figures 9 and 10, respectively.

The lower hook member B comprises a bar 2 having a pair of depending hooks 3 at its respective ends, and provided midway between its ends with a slot or opening 4. The hook member A is likewise formed and comprises a bar 5 having upwardly projecting hook-shaped members 6 at its ends and formed with an opening or slot 7 at its center.

On the lower end of the rod 1, a sleeve 8 is fixed or removably connected in any approved manner, I have shown the sleeve 8 as having a slot 9 therein to receive a pin 10 at the lower portion of the rod 1. This sleeve supports a hook 11, which is preferably in the form of a short rod projected through the sleeve and having its end bent in hook form, as clearly shown in Figure 8. The hook 11 is adapted to be positioned through the opening 4 of hook member B.

A sleeve 12 is loosely mounted on the rod 1 and has a downwardly projecting hook 13 thereon which is adapted to be positioned through the opening 7 of hook member A. An adjusting collar 17 has screw-threaded engagement with the rod 1 and is located above the sleeve 12 and preferably provided with any suitable arrangement of fingerholds 14 to facilitate the turning of the collar.

As shown in Figure 1, the hook member B engages the lower portion of the head 15 of a bed 16, while the hook member A is positioned over the upper portion of the head of the bed. When the collar 17 is screwed downwardly against the sleeve 12 it will cause the hook members A and B to firmly grip the head of the bed, as clearly illustrated in Figure 1.

It is obvious of course that the device may be used on some other object than a bed, and I do not wish to be limited in this particular.

An extension rod 18 has a reduced end 19 which telescopes in the upper end of rod 1 and is coupled thereto by a pin 20 and a slot 21 in the respective parts. The rod 18 supports an arm 22, one end of which is bent or curved and projected downwardly, and has a reduced portion 23 which telescopes in the upper end of the extension rod 18, and a pin 24 on said reduced end engages in a slot 25 in the extension rod to couple the parts together and prevent turning or pivotal movement.

The arm 22 at its free end is provided with a hook 26 which engages an eye 27 formed centrally by upwardly offsetting the metal of a plate 28. This plate 28 is preferably of rectangular form and is provided adjacent the corners thereof with keyhole slots 29. These keyhole slots are adapted to receive upwardly projecting headed lugs 30 on rods 31 so that the rods may be readily removable from the plate.

The ends of these rods 31 carry sleeves 32, and wires 34 have their ends positioned in these sleeves, within which said wires are bent in curved form so that the wires and sleeves form a complete circle for a canopy 35, illustrated by dot and dash lines in Figure 1.

By reason of a construction of this character it will be noted that all of the parts can be readily separated and placed in a very small package for convenience in storing and shipping, and that they can be assembled or coupled without the necessity of employing ordinary bolts and nuts or other parts which take time in operation and which are liable to be lost.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A device of the character described, comprising a screw-threaded rod, a hook on the lower end of the rod, a sleeve mounted to move on the rod and having a hook thereon, hook members adapted to engage a support and having openings receiving the hook at the lower end of the rod and the hook on said sleeve, respectively, and a threaded collar on the rod engaging the sleeve and adapted to clamp the hook members on the support.

2. A device of the character described, comprising a screw-threaded rod, a hook on the lower end of the rod, a sleeve mounted to move on the rod and having a hook thereon, hook members adapted to engage a support and having openings receiving the hook at the lower end of the rod and the hook on said sleeve, respectively, a threaded collar on the rod engaging said sleeve and adapted to clamp the hook members on the support, an extension having one end telescoping in the rod, a slot and pin connection between the extension and the rod preventing turning movement of the rod, an arm having telescoping engagement with the extension, a slot and pin connection between the arm and the extension preventing independent movement of said parts, and a canopy supporting device carried by the free end of said arm.

VIRGINIA P. NELSON.